(12) United States Patent
Wang

(10) Patent No.: US 11,242,282 B2
(45) Date of Patent: Feb. 8, 2022

(54) METHOD FOR PRODUCING REINFORCED GLASS, REINFORCED GLASS AND ELECTRONIC DEVICE

(71) Applicant: GUANGDONG OPPO MOBILE TELECOMMUNICATIONS CORP., LTD., Guangdong (CN)

(72) Inventor: Xiaowei Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 58 days.

(21) Appl. No.: 16/131,112

(22) Filed: Sep. 14, 2018

(65) Prior Publication Data
US 2019/0202734 A1    Jul. 4, 2019

(30) Foreign Application Priority Data
Dec. 29, 2017 (CN) .......................... 201711483696.8

(51) Int. Cl.
*C03C 21/00* (2006.01)
*C03C 19/00* (2006.01)
(Continued)

(52) U.S. Cl.
CPC ............. *C03C 21/002* (2013.01); *B24B 1/00* (2013.01); *B24B 7/17* (2013.01); *B24B 7/241* (2013.01);
(Continued)

(58) Field of Classification Search
CPC .............................. C03C 21/00; C03C 21/002
See application file for complete search history.

(56) References Cited

U.S. PATENT DOCUMENTS 9,758,428 B1 *   9/2017  Zhang ................... A01N 25/10
2013/0169591 A1   7/2013  Hung et al.
(Continued)

FOREIGN PATENT DOCUMENTS

CN    103842310    6/2014
CN    104661977    5/2015
(Continued)

OTHER PUBLICATIONS

EPO, Office Action for EP Application No. 18194344.0, dated Jul. 16, 2019.
(Continued)

*Primary Examiner* — Queenie S Dehghan
(74) *Attorney, Agent, or Firm* — Hodgson Russ LLP

(57) ABSTRACT

A method for producing reinforced glass, reinforced glass and an electronic device are provided. The method for producing reinforced glass includes: subjecting glass to a first reinforcing treatment; detecting a first stress parameter of the glass subjected to the first reinforcing treatment, and determining whether the glass subjected to the first reinforcing treatment is qualified according to the first stress parameter; subjecting the glass to a second reinforcing treatment when the glass subjected to the first reinforcing treatment is qualified; detecting a second stress parameter of the glass subjected to the second reinforcing treatment, and determining whether the glass subjected to the second reinforcing treatment is qualified according to the second stress parameter; and subjecting the glass to a touch-polishing treatment when the glass subjected to the second reinforcing treatment is qualified, so as to obtain the reinforced glass.

9 Claims, 3 Drawing Sheets

(51) Int. Cl.
*C03C 23/00* (2006.01)
*B24B 7/24* (2006.01)
*B24B 1/00* (2006.01)
*B24B 7/17* (2006.01)

(52) U.S. Cl.
CPC .......... *C03C 19/00* (2013.01); *C03C 23/0075* (2013.01); *C03C 2203/50* (2013.01); *C03C 2217/78* (2013.01)

(56) References Cited

U.S. PATENT DOCUMENTS

| | | | |
|---|---|---|---|
| 2013/0269392 A1 | 10/2013 | Ono et al. | |
| 2014/0227525 A1 | 8/2014 | Matsuda et al. | |
| 2017/0197384 A1* | 7/2017 | Finkeldey | B32B 17/10036 |
| 2017/0291849 A1* | 10/2017 | Dejneka | C03C 3/091 |
| 2019/0248702 A1* | 8/2019 | Lee | B32B 17/10128 |
| 2019/0276356 A1* | 9/2019 | Abbott | C03C 21/002 |

FOREIGN PATENT DOCUMENTS

| | | |
|---|---|---|
| CN | 104837781 | 8/2015 |
| CN | 106220001 | 12/2016 |
| CN | 106348621 | 1/2017 |
| CN | 106830709 | 6/2017 |
| CN | 107265845 | 10/2017 |
| CN | 107265885 | 10/2017 |
| TW | 201228952 | 7/2012 |
| TW | 201736299 | 10/2017 |
| WO | 2017087742 | 5/2017 |

OTHER PUBLICATIONS

WIPO, English Translation of ISR/WO for PCT/CN2018/104820, Dec. 12, 2018.
EPO, Communication for EP Application No. 18194344.0, dated Feb. 18, 2021.
SIPO, First Office Action for CN Application No. 201711483696.8, dated Jan. 27, 2021.
CNIPA, Second Office Action for CN Application No. 201711483696.8, dated Sep. 17, 2021.
Zhang et al., "Photovoltaic Module Manufacturing Technology 2", Beijing Electric University Press, Beijing, Oct. 31, 2017, p. 52.
Wang et al., "Explanation Manual for Flat Panel Display", Part 1, Southeast University Press, Nanjing, Dec. 31, 2016, pp. 314-316.

* cited by examiner

METHOD FOR PRODUCING REINFORCED GLASS, REINFORCED GLASS AND ELECTRONIC DEVICE

CROSS-REFERENCE TO RELATED APPLICATION

This application claims priority to and benefits of Chinese Patent Application Serial No. 201711483696.8, filed with the State Intellectual Property Office of P. R. China on Dec. 29, 2017, the entire content of which is incorporated herein by reference.

FIELD

The present disclosure relates to the field of glass surface processing, and more particularly to a method for producing reinforced glass, reinforced glass and an electronic device.

BACKGROUND

With the improvement of consumption level, in addition to pursuing diversified functions, consumers' requirements on appearance and quality of electronic products are increasing. At present, glass materials are widely used in electronic devices because of their good light transmittance, corrosion resistance, heat resistance and easy processing. For example, flat glass is widely used to beautify a shell of an electronic device and protect a display screen of the electronic device. Reinforcing treatments are commonly performed on glass materials of electronic devices to enhance their surface strength and impact resistance so as to improve their service life and security.

SUMMARY

In embodiments of a first aspect of the present disclosure, a method for producing reinforced glass is provided. The method includes: subjecting glass to a first reinforcing treatment; detecting a first stress parameter of the glass subjected to the first reinforcing treatment, and determining whether the glass subjected to the first reinforcing treatment is qualified according to the first stress parameter; subjecting the glass to a second reinforcing treatment when the glass subjected to the first reinforcing treatment is qualified; detecting a second stress parameter of the glass subjected to the second reinforcing treatment, and determining whether the glass subjected to the second reinforcing treatment is qualified according to the second stress parameter; and subjecting the glass to a touch-polishing treatment when the glass subjected to the second reinforcing treatment is qualified, so as to obtain the reinforced glass.

In embodiments of a second aspect of the present disclosure, a reinforced glass is provided. The reinforced glass is produced by the method as described above.

In embodiments of a third aspect of the present disclosure, an electronic device is provided. The electronic device includes: a shell, provided with a main board and a memory therein; a screen, disposed at a top of the shell and connected with the main board; a cover plate, disposed above the shell, in which at least a part of at least one of the shell and the cover plate includes the reinforced glass as described above.

BRIEF DESCRIPTION OF THE DRAWINGS

These and other aspects and advantages of embodiments of the present disclosure will become apparent and more readily appreciated from the following descriptions made with reference to the drawings, in which.

REFERENCE NUMERALS

Figure 1:
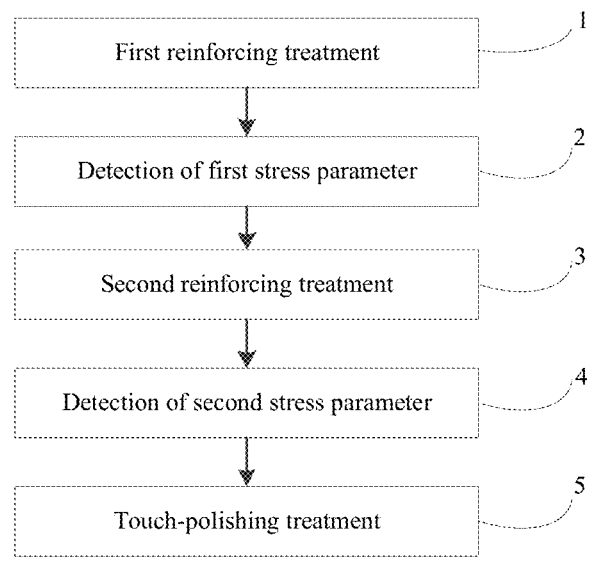
FIG. 1 is a flow chart of a method for producing reinforced glass according to an embodiment of the present disclosure.

1000: electronic device; 100: cover plate.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

Embodiments of the present disclosure will be described in detail in the following descriptions, examples of which are illustrated in the accompanying drawings, in which the same or similar elements and elements having same or similar functions are denoted by like reference numerals throughout the descriptions. The embodiments described herein with reference to the accompanying drawings are explanatory and illustrative, and used to generally understand the present disclosure. The embodiments shall not be construed to limit the present disclosure.

In the related art, in order to enhance the surface strength and impact resistance of the glass of electronic devices, a reinforcing treatment is commonly performed. A reinforcing method is to form a compressive stress layer on a surface or a near surface region of the glass, which is achieved by ion exchange between effluent ions of the glass and exchange ions in a reinforcing solution for a certain period of time at a high temperature. When suffering from an external tensile stress, the compressive stress layer can counteract the external tensile stress so as to reduce a risk of being broken, thereby improving the strength of glass.

Moreover, in order to achieve reinforced glass with a good performance, two reinforcing treatments are usually performed in a glass reinforcing method in the related art. However, the inventor has found through intensive studies that it is difficult to achieve a good glass reinforcement effect by the method because of inaccurate process controls, and the main reasons are as follows:

(1) In the process of ion exchange, effluent ions from the glass will dilute exchange ions in a reinforcing solution, causing the pollution of the reinforcing solution and shortening service life of the reinforcing solution. For example, in a first reinforcing treatment, lithium ions precipitated from the glass will dilute sodium ions in a first reinforcing solution, resulting in the pollution of the first reinforcing solution. Generally, the first reinforcing solution has a preset service life, before which if it is not found that the first reinforcing solution has failed, but the first reinforcing solution is still used to reinforce subsequent glass, the glass reinforced with the failed reinforcing solution will be unqualified in strength, however, these unqualified glass will enter follow-up reinforcing steps, finally resulting in a decreased product yield, wasting the production process and production cost.

(2) In the glass reinforcing method where two reinforcing treatments are performed, the glass cannot be cooled evenly and quickly after reinforced with the first reinforcing solution and a second reinforcing solution, such that the reinforced glass produced thereby has a low product yield and a poor performance.

(3) In the glass reinforcing method where two reinforcing treatments are performed, after the glass is reinforced, stress parameters of the reinforced glass are measured by a stress testing equipment with the aid of a support testing software. Due to equipment constraints, not all the four key parameters, i.e., a surface compressive stress (CS, reported in MPa), a compressive stress at knee point (CSK, reported in MPa), a depth of knee point (DOL, reported in μm) for reflecting an ion exchange depth such as between $K^+$ and $Na^+$, and a depth of compressive layer (DOC, reported in μm) for reflecting an ion exchange depth such as between $Li^+$ and $Na^+$, can be accurately and directly measured by a testing software, but some parameters, such as CSK and DOC, are acquired by formula calculation. However, the accuracy of formula calculation depends on the normalization of the reinforcing process, a deviated reinforcing process or change of the service life of the reinforcing solution both will result in inaccurate calculation results, such that some glass with unqualified performance enters follow-up reinforcing steps, finally resulting in a decreased product yield, wasting the production process and production cost.

(4) In the glass reinforcing method where two reinforcing treatments are performed, the reinforced glass is not cleaned thoroughly, leaving precipitates of the effluent ions on the glass to form dirt, thereby affecting the performance of the glass.

(5) In the glass reinforcing method where two reinforcing treatments are performed, inaccurate definitions of touch-polishing parameters and inaccurate control of touch-polishing removal amounts in the touch-polishing process result in substandard stress values and an imbalanced stress distribution, thereby reducing the product yield.

Therefore, if a new glass reinforcing method can be proposed where individual processes are improved and can be accurately controlled, the above-mentioned problems will be improved or even be solved.

In embodiments of a first aspect of the present disclosure, there is provided a method for producing reinforced glass, including:

subjecting glass to a first reinforcing treatment;

detecting a first stress parameter of the glass subjected to the first reinforcing treatment, and determining whether the glass subjected to the first reinforcing treatment is qualified according to the first stress parameter;

subjecting the glass to a second reinforcing treatment when the glass subjected to the first reinforcing treatment is qualified;

detecting a second stress parameter of the glass subjected to the second reinforcing treatment, and determining whether the glass subjected to the second reinforcing treatment is qualified according to the second stress parameter; and subjecting the glass to a touch-polishing treatment when the glass subjected to the second reinforcing treatment is qualified, so as to obtain the reinforced glass.

In embodiments of the present disclosure, the method further includes: subjecting the glass subjected to the first reinforcing treatment to a cooling treatment when discharged from a furnace.

In embodiments of the present disclosure, the first stress parameter includes a first surface compressive stress value and a compressive stress value at knee point, and the method further includes: adding anhydrous trisodium phosphate to a reinforcing solution of the first reinforcing treatment when the first stress parameter meets at least one of the following conditions that:

a difference between the first surface compressive stress value and a first preset surface compressive stress value is not greater than 10% of the first preset surface compressive stress value;

a difference between the compressive stress value at knee point and a preset compressive stress value at knee point is not greater than 10% of the preset compressive stress value at knee point, where the preset compressive stress value at knee point is 10 to 25 MPa greater than a standard compressive stress value at knee point of the reinforced glass.

In embodiments of the present disclosure, the method further includes: subjecting the glass subjected to the first reinforcing treatment to a first cleaning treatment.

In embodiments of the present disclosure, a time of the first cleaning treatment is 80 to 150 min.

In embodiments of the present disclosure, the first stress parameter includes a compressive stress value at knee point, and determining whether the glass subjected to the first reinforcing treatment is qualified according to the first stress parameter includes:

determining whether the compressive stress value at knee point is greater than a preset compressive stress value at knee point, where the preset compressive stress value at knee point is 10 to 25 MPa greater than a standard compressive stress value at knee point of the reinforced glass, if the compressive stress value at knee point is greater than the preset compressive stress value at knee point, determining that the glass subjected to the first reinforcing treatment is qualified;

if the compressive stress value at knee point is not greater than the preset compressive stress value at knee point, determining that the glass subjected to the first reinforcing treatment is unqualified.

In embodiments of the present disclosure, the method further includes: subjecting the glass subjected to the second reinforcing treatment to a cooling treatment when discharged from a furnace.

In embodiments of the present disclosure, the method further includes: subjecting the glass subjected to the second reinforcing treatment to a second cleaning treatment.

In embodiments of the present disclosure, a time of the second cleaning treatment is 60 to 100 min.

In embodiments of the present disclosure, the second stress parameter includes a second surface compressive stress value, and determining whether the glass subjected to the second reinforcing treatment is qualified according to the second stress parameter includes:

determining whether the second surface compressive stress value is greater than a second preset surface compressive stress value, where the second preset surface compressive stress value is 30 to 80 MPa greater than a standard surface compressive stress value of the reinforced glass, if the second surface compressive stress value is greater than the second preset surface compressive stress value, determining that the glass subjected to the second reinforcing treatment is qualified;

if the second surface compressive stress value is not greater than the second preset surface compressive stress value, determining that the glass subjected to the second reinforcing treatment is unqualified.

In embodiments of the present disclosure, subjecting the glass to a touch-polishing treatment includes:

adjusting parameters of the touch-polishing treatment such that a compressive stress cutting value at a bottom of the reinforced glass subjected to the touch-polishing treatment is not less than that at a front of the reinforced glass.

In embodiments of the present disclosure, the difference between the compressive stress cutting value at the bottom of the reinforced glass and that at the front of the reinforced glass is controlled to be less than 30 MPa.

In embodiments of the present disclosure, the method further includes: controlling the compressive stress cutting value at the front of the reinforced glass to be 40 to 60 MPa.

In embodiments of the present disclosure, the method further includes: controlling the compressive stress cutting value at the front of the reinforced glass to be 40 to 60 MPa.

Through making improvements to individual processes of the existing glass reinforcing method where two reinforcing treatments are performed and realizing accurate controls of the individual processes, the method according to embodiments of the present disclosure achieves a good reinforcing effect, not only improving the performance of the reinforced glass produced thereby, but saving the production cost.

In embodiments of a second aspect of the present disclosure, a reinforced glass is provided. The reinforced glass is produced by a method including:

subjecting glass to a first reinforcing treatment;

detecting a first stress parameter of the glass subjected to the first reinforcing treatment, and determining whether the glass subjected to the first reinforcing treatment is qualified according to the first stress parameter;

subjecting the glass to a second reinforcing treatment when the glass subjected to the first reinforcing treatment is qualified;

detecting a second stress parameter of the glass subjected to the second reinforcing treatment, and determining whether the glass subjected to the second reinforcing treatment is qualified according to the second stress parameter; and subjecting the glass to a touch-polishing treatment when the glass subjected to the second reinforcing treatment is qualified, so as to obtain the reinforced glass.

In embodiments of the present disclosure, a compressive stress cutting value at a bottom of the reinforced glass is not less than that at a front of the reinforced glass.

In embodiments of the present disclosure, the difference between the compressive stress cutting value at the bottom of the reinforced glass and that at the front of the reinforced glass is less than 30 MPa.

In embodiments of the present disclosure, the compressive stress cutting value at the front of the reinforced glass is 40 to 60 MPa.

In embodiments of a third aspect of the present disclosure, an electronic device is provided. The electronic device includes:

a shell, provided with a main board and a memory therein;

a screen, disposed at a top of the shell and connected with the main board;

a cover plate, disposed above the shell, in which at least a part of at least one of the shell and the cover plate includes reinforced glass, in which a compressive stress cutting value at a bottom of the reinforced glass is not less than that at a front of the reinforced glass.

In embodiments of the present disclosure, the reinforced glass is produced by a method including:

subjecting glass to a first reinforcing treatment;

detecting a first stress parameter of the glass subjected to the first reinforcing treatment, and determining whether the glass subjected to the first reinforcing treatment is qualified according to the first stress parameter;

subjecting the glass to a second reinforcing treatment when the glass subjected to the first reinforcing treatment is qualified;

detecting a second stress parameter of the glass subjected to the second reinforcing treatment, and determining whether the glass subjected to the second reinforcing treatment is qualified according to the second stress parameter; and subjecting the glass to a touch-polishing treatment when the glass subjected to the second reinforcing treatment is qualified, so as to obtain the reinforced glass, in which the first stress parameter includes a compressive stress value at knee point, and determining whether the glass subjected to the first reinforcing treatment is qualified according to the first stress parameter includes:

determining whether the compressive stress value at knee point is greater than a preset compressive stress value at knee point, where the preset compressive stress value at knee point is 10 to 25 MPa greater than a standard compressive stress value at knee point of the reinforced glass, if the compressive stress value at knee point is greater than the preset compressive stress value at knee point, determining that the glass subjected to the first reinforcing treatment is qualified;

if the compressive stress value at knee point is not greater than the preset compressive stress value at knee point, determining that the glass subjected to the first reinforcing treatment is unqualified.

As illustrated in FIG. 1, the method according to embodiments of the present disclosure includes operations at blocks illustrated in FIG. 1.

At block 1, glass is subjected to a first reinforcing treatment.

In this operation, the glass is subjected to the first reinforcing treatment. In the present disclosure, the glass is not specifically restricted with respect to materials, thickness, size, etc., which can be chosen by those skilled in the related art as required. For example, in an embodiment, the glass may be Corning GG5 glass. In an embodiment, parameters like a material ratio of a first reinforcing solution, a reinforcing temperature and a reinforcing time used in the first reinforcing treatment may refer to recommended values of manufacturers of the glass, which are not specifically restricted herein.

In embodiments of the present disclosure, the glass subjected to the first reinforcing treatment needs to be cooled when discharged from a furnace. In this way, the glass subjected to the first reinforcing treatment can be cooled evenly and quickly, thereby improving the performance and the product yield of the reinforced glass produced. In embodiments of the present disclosure, a process for evenly and quickly cooling the glass subjected to the first reinforcing treatment when discharged from the furnace will not be specifically restricted. For example, a cold circulation fan disposed in the furnace may be started to cool the glass subjected to the first reinforcing treatment when the glass subjected to the first reinforcing treatment is still in the furnace and ready to be discharged from the furnace, so as to ensure that the glass subjected to the first reinforcing treatment can be cooled at the same time of being discharged from the furnace. In embodiments of the present disclosure, a cart-based cooling fan outside the furnace may also be used. Before discharging the glass subjected to the first reinforcing treatment from the furnace, the cart-based cooling fan may be moved outside the furnace to wait so as to ensure that the glass subjected to the first reinforcing treatment can be cooled immediately when discharged from the furnace. An area and a height of the cooling fan may be maximized to ensure the whole glass subjected to the first reinforcing treatment and discharged from the furnace to be covered, such that the glass subjected to the first reinforcing treatment and discharged from the furnace can be cooled evenly and quickly, thereby avoiding the decrease of the performance and the product yield of the glass subjected to the first reinforcing treatment since the glass is not cooled evenly and quickly.

At block 2, a first stress parameter is detected.

Figure 4:
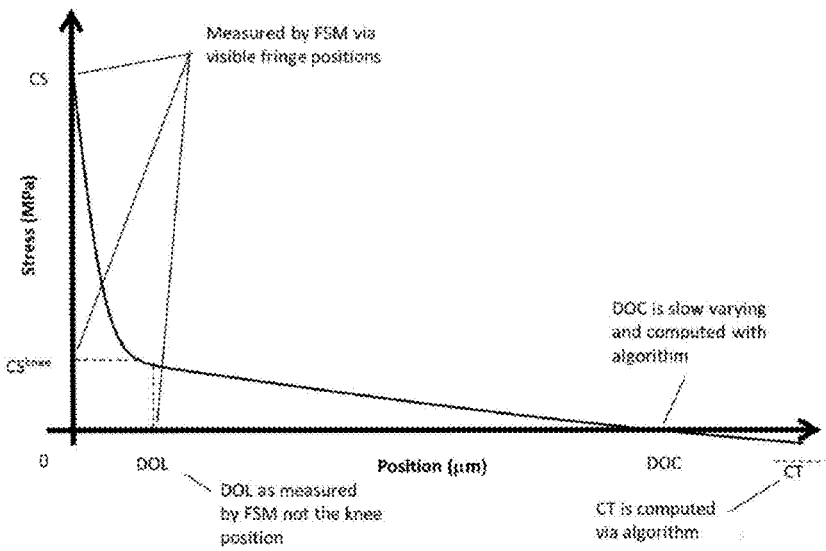
FIG. 4 is a schematic diagram illustrating a relationship among several stress parameters.

In this operation, the first stress parameter of the glass subjected to the first reinforcing treatment is detected so as to determine whether performances of the glass subjected to the first reinforcing treatment reach a standard. In embodiments of the present disclosure, the first stress parameter is not specifically restricted, and may be those capable of reflecting the performances of the glass subjected to the first reinforcing treatment, such as a surface compressive stress (CS, reported in MPa), a compressive stress at knee point (CSK, reported in MPa), a depth of knee point (DOL, reported in μm) for reflecting an ion exchange depth such as between $K^+$ and $Na^+$, or a depth of compressive layer (DOC, reported in μm) for reflecting an ion exchange depth such as between $Li^+$ and $Na^+$ Specifically, as illustrated in FIG. 4, the CS mainly affects a surface strength of the glass, the CSK mainly affects a puncture resistance of the glass, the DOL, i.e., a reinforcing depth of the glass, may affect a strength of the glass, and the DOC, mainly reflecting the reinforcing depth of the glass, also will affect the puncture resistance of the glass.

The inventor has found that, in an ion exchange of the first reinforcing treatment, effluent ions from the glass will dilute exchange ions in the reinforcing solution (i.e., the first reinforcing solution), for example, lithium ions precipitated from the glass will dilute sodium ions in the first reinforcing solution, causing the pollution of the first reinforcing solution and shortening the service life of the first reinforcing solution. The first reinforcing solution has a preset service life, before which if it is not found that the first reinforcing solution has failed, but the first reinforcing solution is still used to reinforce subsequent glass, the glass reinforced in the first reinforcing treatment with the failed first reinforcing solution will be unqualified in strength, however, these unqualified glass will enter follow-up reinforcing steps, finally resulting in a failure production process and decreased product yield, and wasting materials.

Figure 2:
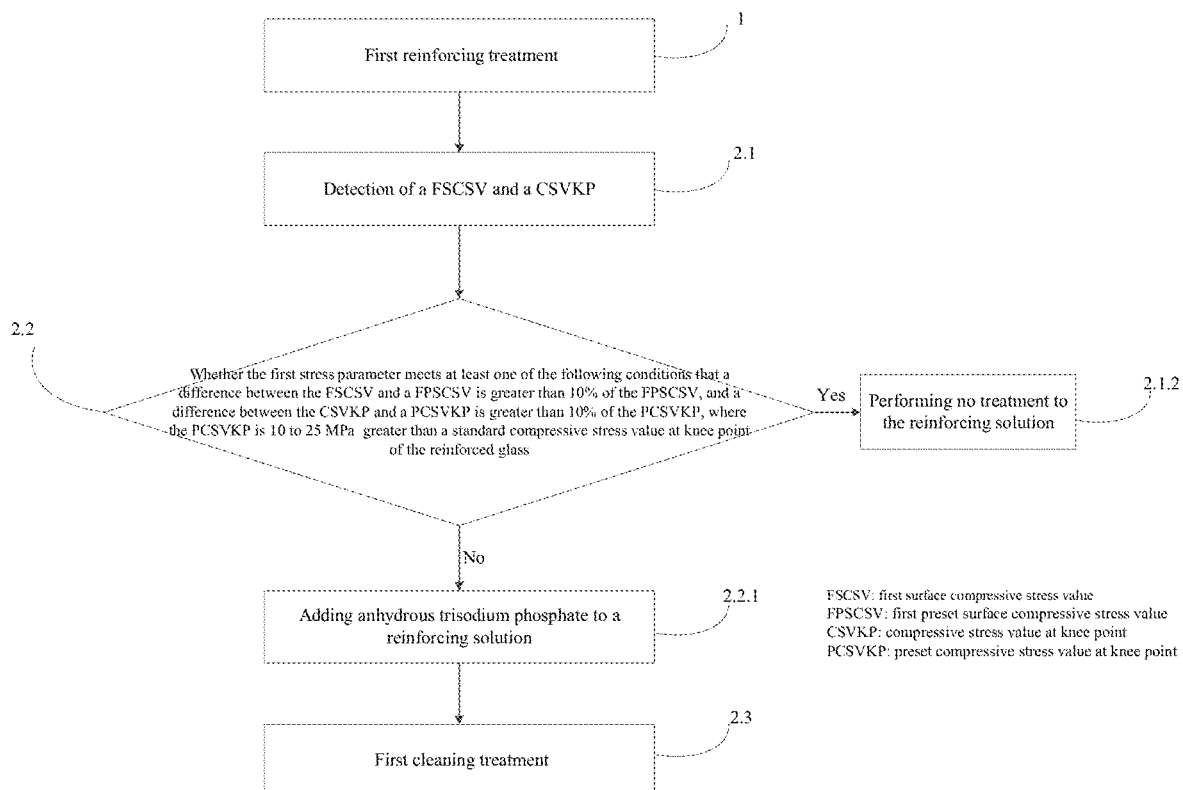
FIG. 2 is a flow chart of a method for producing reinforced glass according to another embodiment of the present disclosure.

According to the method in embodiments of the present disclosure, as illustrated in FIG. 2, by detecting a first surface compressive stress value and a compressive stress value at knee point of the glass subjected to the first reinforcing treatment (2.1), and comparing the first surface compressive stress value and the compressive stress value at knee point with preset stress values (i.e., a first preset surface compressive stress value and a preset compressive stress value at knee point, where the preset compressive stress value at knee point is 10 to 25 MPa greater than a standard compressive stress value at knee point of the finally produced reinforced glass) of the glass subjected to the first reinforcing treatment, respectively (2.2), a concentration of the exchange ions in the first reinforcing solution can be detected easily and conveniently. If the concentration of the exchange ions in the first reinforcing solution is lower, the first surface compressive stress value and the compressive stress value at knee point are relatively small and smaller than the corresponding preset values, thereby resulting in the poor performance of the glass subjected to the first reinforcing treatment.

When the first surface compressive stress value and the compressive stress value at knee point (the parameters will decrease gradually with consumption of the first reinforcing solution) are close to lower limits of the corresponding preset values, when the first stress parameter meets at least one of the following conditions that a difference between the first surface compressive stress value and the first preset surface compressive stress value is not greater than 10% of the first preset surface compressive stress value, and a difference between the compressive stress value at knee point and the preset compressive stress value at knee point is not greater than 10% of the preset compressive stress value at knee point (2.2.1), anhydrous trisodium phosphate may be added into the first reinforcing solution to adsorb and precipitate the effluent ions $Li^+$ which enter the first reinforcing solution from the glass through the ion exchange, so as to reduce the pollution of $Li^+$ to the first reinforcing solution to revert the first stress parameter back to a normal range, avoiding failure of the first reinforcing solution and thus avoiding decreases of the performance and the product yield of the glass subjected to the first reinforcing treatment.

It should be noted that, in order to ensure the effects of the first reinforcing treatment, when any one of the first surface compressive stress value and the compressive stress value at knee point detected actually is close to the lower limit of the corresponding preset value, it is determined that the first reinforcing solution of the first reinforcing treatment needs to be supplemented. In embodiments of the present disclosure, based on the detection results, the anhydrous trisodium phosphate may be added into the first reinforcing solution of the first reinforcing treatment for several times so as to prolong the service life of the first reinforcing solution to a maximum limit. When the difference between the first surface compressive stress value and the first preset surface compressive stress value is greater than 10% of the first preset surface compressive stress value, and the difference between the compressive stress value at knee point and the preset compressive stress value at knee point is greater than 10% of the preset compressive stress value at knee point, no treatment is performed to the first reinforcing solution (2.1.2).

According to embodiments of the present disclosure, the inventor has found that, after adding anhydrous trisodium phosphate, insoluble lithium salts formed by phosphate anions and $Li^+$ ions are attached to the surface of the reinforced glass to form dirt, affecting the performance of the glass subjected to the first reinforcing treatment. In view of this, a first cleaning treatment may be performed to the glass subjected to the first reinforcing treatment (2.3). In embodiments of the present disclosure, implementations of the first cleaning treatment are not specifically restricted, for example, the first cleaning treatment may be carried out through bubbling with compressed air in a cleaning tank or through ultrasonic cleaning. In some embodiments, a time of the first cleaning treatment may be in a range from 80 to 150 min to ensure that the glass subjected to the first reinforcing treatment is cleaned, thereby improving the performance of the product.

In embodiments of the present disclosure, the first stress parameter may be directly measured by a stress testing equipment with the aid of a support testing software, some parameters, such as CSK and DOC, are obtained by formula calculation. The inventor has found that, the accuracy of formula calculation depends on the normalization of the reinforcing process, a deviated reinforcing process or change of the service life of the first reinforcing solution both will result in inaccurate calculation results. Therefore, with the method according to embodiments of the present disclosure, by properly raising the qualified standard of the first stress parameter of the glass subjected to the first reinforcing treatment, adverse effects on a subsequent reinforcing treatment can be buffered appropriately, and the inaccurate measurement of the first stress parameter due to the process deviation can be avoided, thereby avoiding entrance of actual unqualified glass into the follow-up processes resulting from the inaccurate measurement of the first stress parameter, and further avoiding wastes of the production process and production cost.

Figure 3:
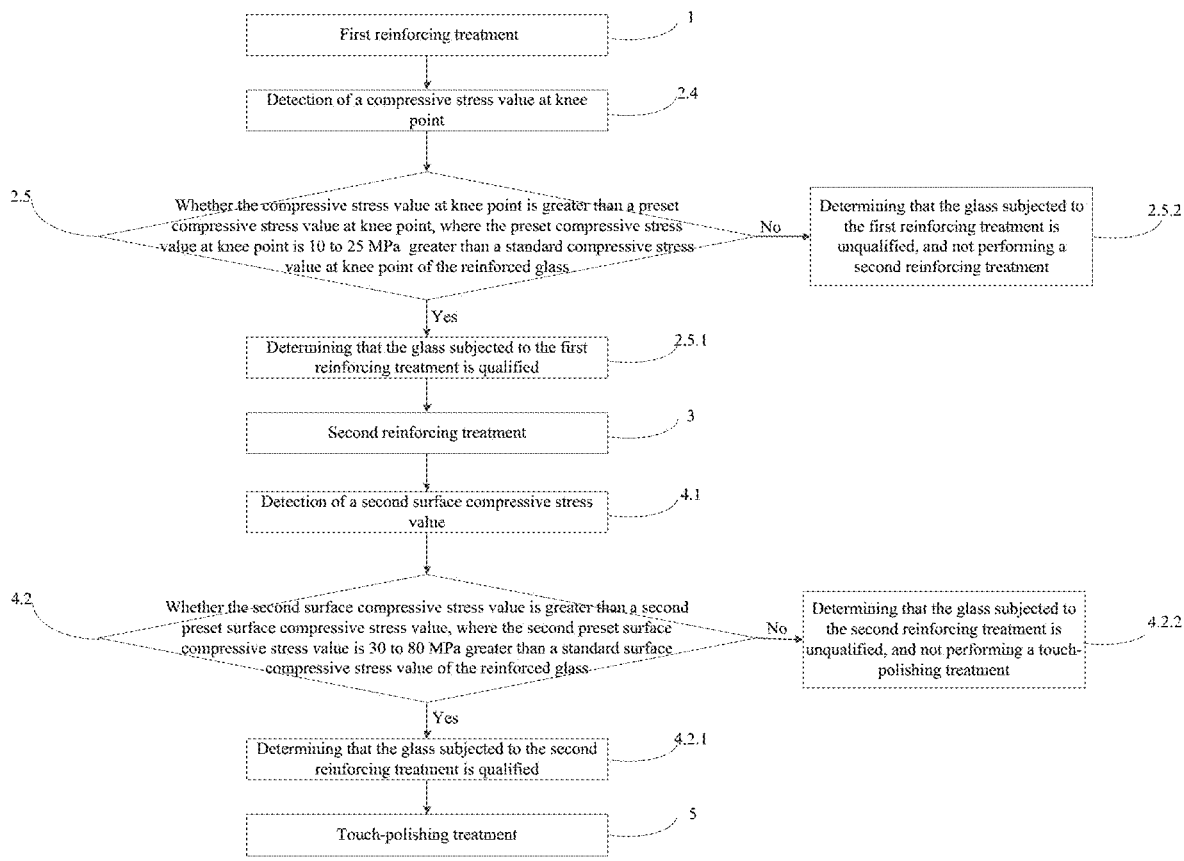
FIG. 3 is a flow chart of a method for producing reinforced glass according to an additional embodiment of the present disclosure.

As illustrated in FIG. 3, in embodiments of the present disclosure, after the first reinforcing treatment, the compressive stress value at knee point of the glass subjected to the first reinforcing treatment may be determined (2.4), and it is determined whether the compressive stress value at knee point is greater than a preset compressive stress value at knee point, where the preset compressive stress value at knee point is 10 to 25 MPa greater than a standard compressive stress value at knee point of the finally produced reinforced glass (2.5), if the compressive stress value at knee point is greater than the preset compressive stress value at knee point, it is determined that the glass subjected to the first reinforcing treatment is qualified (2.5.1), and a second reinforcing treatment is performed (3); if the compressive stress value at knee point is not greater than the preset compressive stress value at knee point, it is determined that the glass subjected to the first reinforcing treatment is unqualified, and the second reinforcing treatment is not performed (2.5.2). In this way, the unqualified glass can be removed in advance, thereby saving the production process and production cost. In addition, the unqualified glass can continue to be used, rather than directly scrapped after the completion of all processes, thereby avoiding wastes of the production process and production cost.

At block 3, the glass is subjected to a second reinforcing treatment.

In this operation, the second reinforcing treatment is performed to the glass subjected to the first reinforcing treatment. According to embodiments of the present disclosure, in this operation, parameters like a material ratio of a second reinforcing solution, a reinforcing temperature and a reinforcing time may refer to recommended values of manufacturers of the glass, which are not specifically restricted herein. In embodiments of the present disclosure, the glass subjected to the second reinforcing treatment may be cooled when discharged from a furnace. In this way, the glass subjected to the second reinforcing treatment can be cooled evenly and quickly, thereby improving the performance and the product yield of the reinforced glass produced. In embodiments of the present disclosure, a process for evenly and quickly cooling the glass subjected to the second reinforcing treatment will not be specifically restricted, which for example may be the same as that for the glass subjected to the first reinforcing treatment, and will not be elaborated herein. In some embodiments, a second cleaning treatment may be performed to the glass subjected to the second reinforcing treatment. In this way, precipitates of the effluent ions attached to the surface of the glass can be eliminated easily and conveniently, thereby improving the performance of the reinforced glass produced. In the present disclosure, a process for the second cleaning treatment is not specifically restricted herein, which for example may be the same as that for the first cleaning treatment, and will not be elaborated herein. In some embodiments, a time of the second cleaning treatment may be in a range from 60 to 100 min. Therefore, the glass subjected to the second reinforcing treatment can be cleaned sufficiently to further improve the use performance of the product.

At block 4, a second stress parameter is detected.

In this operation, the second stress parameter of the glass subjected to the second reinforcing treatment is detected. In embodiments of the present disclosure, the second stress parameter may include a second surface compressive stress value. In some embodiments, the second surface compressive stress value may be directly measured by the stress testing equipment with the aid of the support testing software. With the method according to embodiments of the present disclosure, by properly raising the qualified standard of the second stress parameter of the glass subjected to the second reinforcing treatment, adverse effects on a subsequent touch-polishing treatment can be buffered appropriately, thereby improving the product yield and saving the cost. As illustrated in FIG. 3, in embodiments of the present disclosure, the method may include detecting a second surface compressive stress value of the glass subjected to the second reinforcing treatment (4.1), and determining whether the second surface compressive stress value is greater than a second preset surface compressive stress value, where the second preset surface compressive stress value is 30 to 80 MPa greater than a standard surface compressive stress value of the finally produced reinforced glass (4.2), if the second surface compressive stress value is greater than the second preset surface compressive stress value, determining that the glass subjected to the second reinforcing treatment is qualified (4.2.1), and subjecting the glass to a touch-polishing treatment (5); if the second surface compressive stress value is not greater than the second preset surface compressive stress value, determining that the glass subjected to the second reinforcing treatment is unqualified, and not subjecting the glass subjected to the second reinforcing treatment to the touch-polishing treatment (4.2.2). In this way, the unqualified glass can be removed in advance, thereby saving the production process and production cost. In addition, the unqualified glass can continue to be used, rather than directly scrapped after the completion of all processes, thereby avoiding wastes of the production process and production cost.

At block 5, the glass subjected to the second reinforcing treatment is subjected to a touch-polishing treatment so as to obtain the reinforced glass.

In this operation, the glass subjected to the second reinforcing treatment is subjected to the touch-polishing treatment so as to obtain the finally reinforced glass. The inventor has found that, in the existing methods for producing reinforced glass, inaccurate definitions of touch-polishing parameters and inaccurate control of touch-polishing removal amounts in the touch-polishing process result in substandard stress values and an imbalanced stress distribution, thereby reducing the product yield. According to the method of the present disclosure, a compressive stress cutting value at a bottom of the reinforced glass subjected to the touch-polishing treatment is not less than that at a front of the reinforced glass, thereby avoiding occurrences of substandard stress values and imbalanced compressive stress distribution to the glass subjected to the touch-polishing treatment, and improving the product yield. In embodiments of the present disclosure, in order to guarantee the removal amounts at both the bottom and front of the glass, a red abrasive disk with a larger cutting value may be used in the touch-polishing treatment as a lower abrasive disk, or an upper abrasive disk and the lower abrasive disk may be simultaneously operated at an earlier stage of the touch-polishing treatment, while at a later stage of the touch-polishing treatment, only the lower abrasive disk is operated, and the upper abrasive disk may be fixed, so as to avoiding that the compressive stress cutting value at the bottom of the reinforced glass is less than that at the front of the reinforced glass. In embodiments of the present disclosure, a difference between the compressive stress cutting value at the bottom of the reinforced glass and that at the front of the reinforced glass is less than 30 MPa. In some embodiments, the compressive stress cutting value at the front of the reinforced glass is in a range from 40 to 60 MPa. Therefore, through the touch-polishing treatment, the product yield and use performance of the glass are further improved.

To sum up, the method for producing reinforced glass according to embodiments of the present disclosure can achieve a good reinforcing effect, guarantee the reinforced glass produced thereby to meet the stress standard, and improve the product yield. In addition, the glass can be detected and those not meeting the stress standard can be removed in advance, thereby saving production processes and lowering the production cost.

In embodiments of a second aspect of the present disclosure, a reinforced glass is provided. The reinforced glass is produced by the method as described above. Therefore, the reinforced glass possesses all the characteristics and advantages of reinforced glass produced by the method as described above, which will not be elaborated herein.

Figure 5:
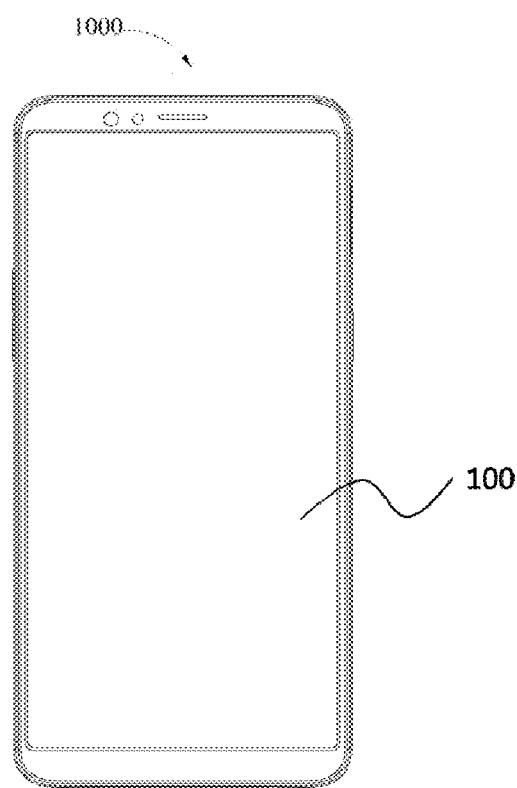
FIG. 5 is a schematic diagram of an electronic device according to an embodiment of the present disclosure.

In embodiments of a third aspect of the present disclosure, an electronic device is provided. As illustrated in FIG. 5, the electronic device 1000 includes: a shell, a screen and a cover plate 100, the shell is provided with a main board and a memory therein, the screen is disposed at a top of the shell and connected with the main board, and the cover plate 100 is disposed above the shell. In embodiments of the present disclosure, at least a part of at least one of the shell and the cover plate 100 includes the reinforced glass as described above. In embodiments of the present disclosure, at least a part of at least one of the shell and the cover plate 100 is made of the reinforced glass as described above. Therefore, the electronic device possesses all the characteristics and advantages of the reinforced glass described above, which will not be elaborated herein.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

Although explanatory embodiments have been illustrated and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for producing reinforced glass, comprising:
    subjecting glass to a first reinforcing treatment, and measuring a compressive stress value at knee point, such that the glass after the first reinforcing treatment has the compressive stress value at knee point greater than a preset compressive stress value at knee point, where the preset compressive stress value at knee point is 10 to 25 MPa greater than a target compressive stress value at knee point of the reinforced glass;
    subjecting the glass after the first reinforcing treatment to a second reinforcing treatment, and measuring a second surface compressive stress value, such that the glass after the second reinforcing treatment has the second surface compressive stress value greater than a second preset surface compressive stress value, where the second preset surface compressive stress value is 30 to 80 MPa greater than a target surface compressive stress value of the reinforced glass; and
    subjecting the glass after the second reinforcing treatment to a touch-polishing treatment, so as to obtain the reinforced glass, comprising:
        adjusting parameters of the touch-polishing treatment such that a compressive stress cutting value at a bottom of the reinforced glass subjected to the touch-polishing treatment is not less than that at a front of the reinforced glass and controlling the compressive stress cutting value at the front of the reinforced glass to be 40 to 60 MPa.

2. The method according to claim 1, further comprising: discharging the glass subjected to the first reinforcing treatment from a furnace, and subjecting the glass subjected to the first reinforcing treatment to a cooling treatment when discharging the glass from the furnace.

3. The method according to claim 1, further comprising: adding anhydrous trisodium phosphate to a reinforcing solution of the first reinforcing treatment when at least one of the following conditions is met:
    a difference between a first surface compressive stress value after the first reinforcing treatment and a first preset surface compressive stress value is not greater than 10% of the first preset surface compressive stress value;
    a difference between the compressive stress value at knee point and a preset compressive stress value at knee point is not greater than 10% of the preset compressive stress value at knee point.

4. The method according to claim 3, further comprising: subjecting the glass subjected to the first reinforcing treatment to a first cleaning treatment.

5. The method according to claim 4, wherein the first cleaning treatment lasts for 80 to 150 min.

6. The method according to claim 1, further comprising: discharging the glass subjected to the second reinforcing treatment from a furnace, and subjecting the glass subjected to the second reinforcing treatment to a cooling treatment when discharging the glass from a furnace.

7. The method according to claim 1, further comprising: subjecting the glass subjected to the second reinforcing treatment to a second cleaning treatment.

8. The method according to claim 7, wherein the second cleaning treatment lasts for 60 to 100 min.

9. The method according to claim 1, wherein the difference between the compressive stress cutting value at the bottom of the reinforced glass and that at the front of the reinforced glass is controlled to be less than 30 MPa.

\* \* \* \* \*